US011687366B2

(12) United States Patent
Vijay et al.

(10) Patent No.: US 11,687,366 B2
(45) Date of Patent: Jun. 27, 2023

(54) INTERRUPT HANDLING METHOD, COMPUTER SYSTEM, AND NON-TRANSITORY STORAGE MEDIUM THAT RESUMES WAITING THREADS IN RESPONSE TO INTERRUPT SIGNALS FROM I/O DEVICES

(71) Applicant: Mitsubishi Electric Corporation, Tokyo (JP)

(72) Inventors: Nikam Tanajirao Vijay, Maharashtra (IN); Patwardhan Kunal, Maharashtra (IN)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 369 days.

(21) Appl. No.: 17/260,580

(22) PCT Filed: Feb. 18, 2019

(86) PCT No.: PCT/JP2019/005802
§ 371 (c)(1),
(2) Date: Jan. 15, 2021

(87) PCT Pub. No.: WO2020/021745
PCT Pub. Date: Jan. 30, 2020

(65) Prior Publication Data
US 2021/0279097 A1     Sep. 9, 2021

(30) Foreign Application Priority Data

Jul. 24, 2018   (IN) .............................. 201821027731

(51) Int. Cl.
*G06F 9/48*     (2006.01)
*G06F 9/30*     (2018.01)
(Continued)

(52) U.S. Cl.
CPC .......... *G06F 9/4881* (2013.01); *G06F 9/3009* (2013.01); *G06F 9/321* (2013.01);
(Continued)

(58) Field of Classification Search
CPC ...... G06F 9/4881; G06F 9/3009; G06F 9/321; G06F 9/4818; G06F 9/4812; G06F 9/485; G06F 9/545
See application file for complete search history.

(56) References Cited

U.S. PATENT DOCUMENTS 7,149,832 B2    12/2006  Wieland et al.
8,074,055 B1 *  12/2011  Yates, Jr. .............. G06F 9/3005
                                                          712/229
(Continued)

FOREIGN PATENT DOCUMENTS

JP    2013-502004 A    1/2013
WO    2012/053095 A1   4/2012

OTHER PUBLICATIONS

International Search Report and Written Opinion dated Apr. 9, 2019, received for PCT Application PCT/JP2019/005802, Filed on Feb. 18, 2019, 8 pages including English Translation.
(Continued)

*Primary Examiner* — Michael W Ayers
(74) *Attorney, Agent, or Firm* — Xsensus LLP

(57) ABSTRACT

The present invention provides an interrupt handling system for handling interrupts in a computer system is provided. The interrupt handling system captures and processes the interrupts in a user space of the computer system. The present invention also provides for an interrupt registration method that facilitates interrupt handling in the user space during porting of user applications from one platform to another.

18 Claims, 2 Drawing Sheets

(51) Int. Cl.
*G06F 9/32* (2018.01)
*G06F 9/54* (2006.01)

(52) U.S. Cl.
CPC .......... *G06F 9/4818* (2013.01); *G06F 9/485* (2013.01); *G06F 9/4812* (2013.01); *G06F 9/545* (2013.01)

(56) References Cited

U.S. PATENT DOCUMENTS

| | | |
|---|---|---|
| 9,378,047 B1 | 6/2016 | Gould et al. |
| 2002/0161957 A1 | 10/2002 | Comeau et al. |
| 2011/0040913 A1 | 2/2011 | Chung et al. |
| 2012/0054750 A1* | 3/2012 | Saripalli ............... G06F 9/5094 718/100 |
| 2012/0191893 A1 | 7/2012 | Kuiper et al. |
| 2013/0185469 A1 | 7/2013 | Motai et al. |
| 2016/0011997 A1* | 1/2016 | Liu ....................... G06F 9/4812 710/268 |
| 2017/0228233 A1* | 8/2017 | Mishaeli ............... G06F 9/3851 |

OTHER PUBLICATIONS

Notice of Reason for Refusal dated Aug. 27, 2019, received for JP Application 2019-538703, 3 pages including English Translation.
Decision to Grant dated Jan. 7, 2020, received for JP Application 2019-538703, 5 pages including English Translation.
Office Action dated Sep. 13, 2022 in Indian Patent Application No. 201821027731, 7 pages.

\* cited by examiner

INTERRUPT HANDLING METHOD, COMPUTER SYSTEM, AND NON-TRANSITORY STORAGE MEDIUM THAT RESUMES WAITING THREADS IN RESPONSE TO INTERRUPT SIGNALS FROM I/O DEVICES

CROSS-REFERENCE TO RELATED APPLICATIONS

The present application is based on PCT filing PCT/JP2019/005802, filed Feb. 18, 2019, which claims priority to IN 201821027731, filed Jul. 24, 2018, the entire contents of each are incorporated herein by reference.

FIELD

The present invention relates generally to computer systems and particularly to techniques of handling interrupts in computer systems.

BACKGROUND

Operating systems are computer programs that act as an intermediary between software applications and hardware of computer systems. The computer systems are equipped with memory to store the operating system, the software applications, and user data. The memory is divided into two parts, viz., kernel space and user space. The kernel space is a set of memory locations in which kernel, which is the core of the operating system, is executed. The user space is a set of memory locations in which user processes, such as the software applications, are executed. The kernel manages the execution of the user processes to prevent interference between user processes. The kernel space can be accessed by the user processes only using system calls. The system calls are the calls made by the user processes that cause the computer system to execute the called function in the kernel space.

The computer systems also include multiple hardware devices to perform various functions such as input/output, networking, communication, and so on. The hardware devices may be connected to processor by way of an interrupt controller. When an event occurs at a hardware device, the hardware device sends an interrupt signal to the processor through the interrupt controller. The processor interrupts the execution of current instruction to handle the interrupt. The processor notifies the operating system that the interrupt has occurred, and the operating system handles the interrupt according to corresponding Interrupt Service Routine (ISR) defined for the interrupt. An ISR, also known as "interrupt handler", is a set of instructions that are executed when an interrupt is triggered. The ISR can be a user-defined function or a built-in function of the operating system.

For example, in Linux operating system environment, the interrupt handlers are executed within the kernel space. While it is desirable to execute the interrupt service routines in the user space, it is extremely difficult to do so because of the difficulties in communicating the interrupts from the kernel space to the user space, thereby consuming a large amount of resources and reducing the efficiency of the computer system.

In a conventional method of communicating interrupts from kernel space to user space as disclosed in U.S. Pat. No. 9,378,047B1, an interrupt is received from a hardware device and is routed to an event queue. In this, the ISR seeks the availability of the event queue. When the event queue is available, the ISR obtains the lock of the event queue and places an event identifying the interrupt channel at the end of the event queue. Thereafter, the ISR releases the lock for the event queue, at which point, the ISR may terminate. Further, once the event reaches the top of the event queue, a user handler thread dequeues the event off the top of the event queue and reconstructs the original interrupt and sends the interrupt to an interrupt servicing handler. Thereafter, the interrupt servicing handler handles the interrupt just as if it were an ISR operating directly in the kernel space. However, the method requires the ISR to be split into two processes. This reduces the efficiency of the computer system and increases the latency and performance overhead incurred while capturing the event data in the kernel space and transferring the captured event data to the user space. Moreover, the method requires writing a kernel space event capturing code in the kernel space and writing corresponding event data processing code in the user space. This increases the complexity of the interrupt handling process.

CITATION LIST

Patent Literature

[Patent Literature 1] U.S. Pat. No. 9,378,047B1

SUMMARY

Technical Problem

Therefore, there is a need for a system and a method to efficiently handle the interrupts in the user space of the operating system, reducing performance overhead and latency in the computer system.

Solution to Problem

This summary is provided to introduce concepts related to an interrupt handling system and a method thereof. This summary is neither intended to identify essential features of the present invention nor intended to determine or limit the scope of the present invention.

In an embodiment of the present invention, there is provided an interrupt handling method for a computer system to execute an interrupt handling program on a second program, the interrupt handling program being created on a first platform. This method includes storing an interrupt number and corresponding interrupt service routine (ISR) handler in a memory of the computer system. The interrupt number corresponds to an input/output (I/O) device coupled with the computer system. That method further includes the steps of: determining a memory location of the input/output device on the basis of the determined user space input/output device number; initiating the input/output device for reading, on the basis of the determined memory location; and creating a thread corresponding to the input/output device. The method further includes the steps of: placing the thread in a wait state for receiving an interrupt signal from the input/output device, wherein the interrupt signal corresponds to an interrupt generated by the input/output device; receiving the interrupt signal from the input/output device; executing the interrupt service routine in a kernel space within the memory in response to receiving the interrupt signal; resuming the thread from wait state on the basis of the interrupt service routine; and executing a user-defined function corresponding to the interrupt signal, in a user space within the memory.

In another embodiment of the present invention, there is provided a computer system including a memory having a user space and a kernel space, and a computing device coupled with the memory. The computing device stores an interrupt number and corresponding interrupt service routine in the memory, wherein the interrupt number corresponds to an input/output device coupled with the computer system; determine a user space input/output device number on a basis of the interrupt number, wherein the user space input/output device number corresponds to the input/output device; determines a memory location of the input/output device on the basis of the determined user space input/output device number; and initiates the I/O device for reading, on the basis of the determined memory location. The computing device also creates a thread corresponding to the input/output device, places the thread in a wait state to receive an interrupt signal from the input/output device, wherein the interrupt signal corresponds to an interrupt generated by the input/output device, receives the interrupt signal from the input/output device, executes the interrupt service routine in the kernel space in response to receiving the interrupt signal, resumes the thread from wait state on the basis of interrupt service routine, and executes a user-defined function corresponding to the interrupt signal, in the user space.

In yet another embodiment of the present invention, there is provided a program product for causing a computer system including a computing device to execute an interrupt handling program on a second platform, the interrupt handling program being created on a first platform. This program product causes the computing device to perform the operations of: storing an interrupt number and corresponding interrupt service routine in a memory coupled with the computing device, wherein the interrupt number corresponds to an input/output device coupled with the computer system; and determining a user space input/output device number on a basis of the interrupt number, wherein the user space input/output device number corresponds to the input/output device. The program product further causes the computing device to perform the operations of: determining a memory location of the input/output device on the basis of the determined user space input/output device number; initiating the input/output device for reading, on the basis of the determined memory location; creating a thread corresponding to the input/output device; placing the thread in a wait state for receiving an interrupt signal from the input/output device, wherein the interrupt signal corresponds to an interrupt generated by the input/output device; receiving the interrupt signal from the input/output device; executing the interrupt service routine in a kernel space within the memory in response to receiving the interrupt signal; resuming the thread from wait state on the basis of the interrupt service routine; and executing a user-defined function corresponding to the interrupt signal, in a user space within the memory.

In an exemplary embodiment, an interrupt event counter is incremented subsequent to receiving the interrupt signal from the I/O device. The interrupt event counter is reset subsequent to executing the user-defined function corresponding to the interrupt signal.

In another exemplary embodiment, a separate thread is created for every interrupt.

In another exemplary embodiment, the interrupt signal corresponding to the I/O device is received by way of an interrupt controller.

In another exemplary embodiment, the thread is assigned highest priority, thereby reducing latency.

Advantageous Effects of Invention

The interrupt handling method according to the present invention provides an effect of efficiently handling the interrupts in the user space of the operating system, reducing performance overhead and latency in the computer system.

DESCRIPTION OF EMBODIMENTS

The detailed description is described with reference to the accompanying figures. Same numbers are used throughout the drawings to reference like features and modules.

It should be appreciated by those skilled in the art that any block diagrams herein represent conceptual views of illustrative systems embodying the principles of the present invention. Similarly, it will be appreciated that any flow charts, flow diagrams, and the like represent various processes which may be substantially represented in computer readable medium and so executed by a computer or processor, whether or not such computer or processor is explicitly shown.

The various embodiments of the present invention provide a computer implemented system and a method of handling interrupts.

In the following description, for purpose of explanation, specific details are set forth in order to provide an understanding of the present invention. It will be apparent, however, to one skilled in the art that the present invention may be practiced without these details.

One skilled in the art will recognize that embodiments of the present invention, some of which are described below, may be incorporated into a number of systems. However, the systems and methods are not limited to the specific embodiments described herein. Further, structures and devices shown in the figures are illustrative of exemplary embodiments of the present invention and are meant to avoid obscuring of the present invention.

Furthermore, connections between components and/or modules within the figures are not intended to be limited to direct connections. Rather, these components and modules may be modified, re-formatted or otherwise changed by intermediary components and modules.

References in the present disclosure to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

The present invention provides a computer system and a method of handling interrupts.

Figure 1:
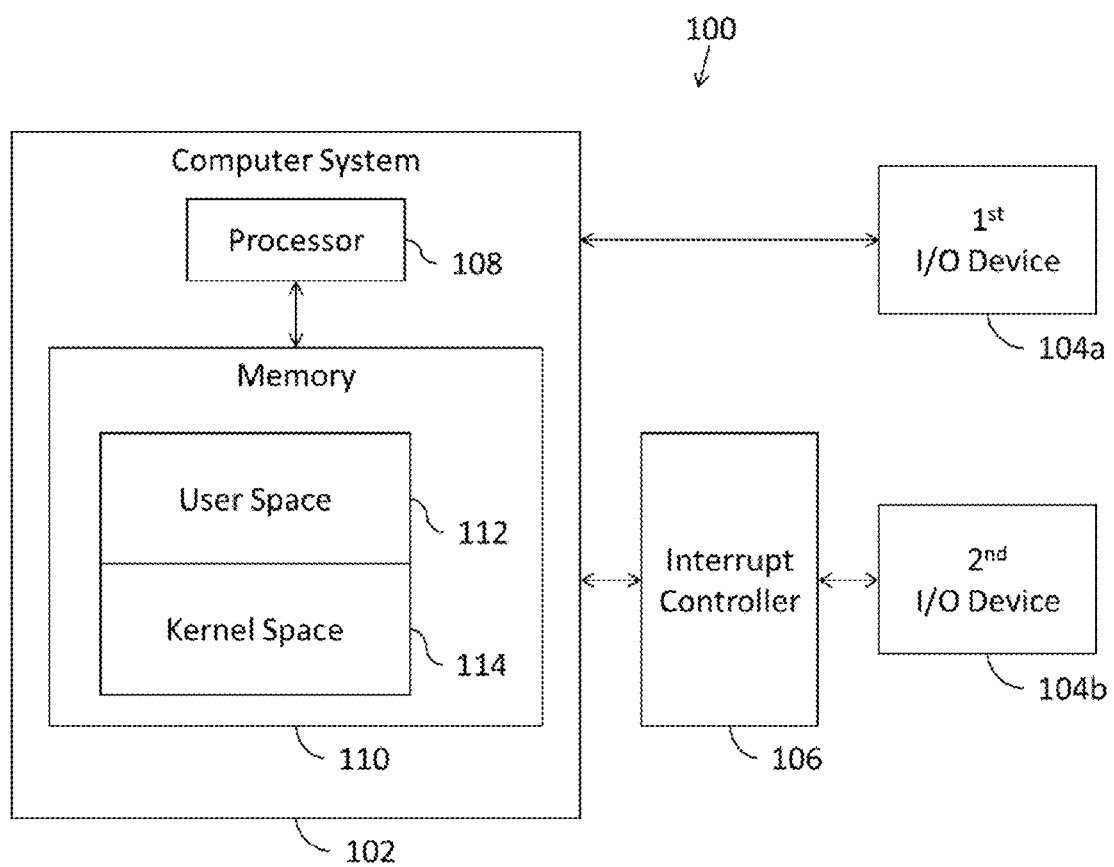
FIG. 1 illustrates a schematic block diagram of a computer implemented interrupt handling system according to an embodiment of the present invention.

Referring now to FIG. 1, a computer implemented interrupt handling system (100) is shown in accordance with an embodiment of the present invention. The computer implemented interrupt handling system (100) includes a computer system (102), a plurality of input/output (I/O) devices (104) including first and second I/O devices (104a and 104b) (also referred singularly as "I/O device (104)"), and an interrupt controller (106). The computer system (102) includes a processor (108) and a memory (110). The memory (110) includes a user space (112) and a kernel space (114).

It will be apparent to a person of ordinary skill in the art that the computer system (102) is not limited to the processor (108) and the memory (110) and may include additional electronic components which are not depicted in FIG. 1 for simplicity.

The I/O devices (104) include peripheral devices connected to the computer system (102). Examples of the I/O devices (104) include input devices such as a keyboard and output devices such as a display device. In an example, the first I/O device (104a) is directly connected to the computer system (102) and the second I/O system (104b) is connected to the computer system (102) by way of the interrupt controller (106). Therefore, it will be apparent to a person of ordinary skill in the art that the interrupt handling system (100) of the present invention is equally operative with various types of direct and indirect connection between the computer system (102) and the I/O devices (104). Further, the interrupt handling system (100) of the present invention is equally operative with or without the presence of the interrupt controller (106).

Each I/O device (104) generates an interrupt which must be serviced by the computer system (102). Hence, each I/O device (104) generates corresponding interrupt signal and transmits the interrupt signal to the computer system (102). Each interrupt is identified using corresponding interrupt number.

The computer system (102) converts a first program created on a first platform into a second program executable on a second platform. Examples of the first program created on the first platform include user applications created on platforms such as VxWorks. Examples of the second program executable on the second platform include user applications executable on operating systems such as Linux. In another example, the first and second programs are different types of user applications executable by the processor (108).

The computer system (102) includes an emulation layer that converts the first program into the second program. The emulation layer includes an interrupt registration Application Programming Interface (API), operating system (OS) libraries, and an OS mechanism. The OS libraries provide conventional in-built functions for handling interrupts in the computer system (102).

In an embodiment of the present invention, a novel interrupt registration API is provided. During initiation of the interrupt registration API, the interrupt numbers corresponding to the interrupt signals of the I/O devices (104) are stored in the memory (110). Further, interrupt service routine (ISR) handlers corresponding to the interrupt signals are also stored in the memory (110). In an exemplary embodiment, the memory (110) stores a look-up table that includes the interrupt numbers corresponding to the interrupt signals, and the ISR corresponding to the interrupt numbers.

The processor (108) determines user space input/output (UIO) numbers corresponding to the interrupt numbers and stores the UIO numbers in the memory (110). In an exemplary embodiment, the processor (108) stores the UIO numbers in the look-up table stored in the memory (110). Thereafter, the processor (108) determines memory locations of the I/O devices (104) based on the UIO numbers. The processor (108) initiates the I/O devices (104) for reading based on the memory locations.

The processor (108) creates a separate thread for every I/O device (104), i.e., every I/O device (104) has a dedicated thread for receiving interrupt signals generated by that I/O device (104). The processor (108) places the threads in wait state for receiving the interrupt signals from corresponding I/O devices (104).

When the computer system (102) receives an interrupt signal from the I/O device (104), the processor (108) executes the ISR corresponding to the thread in the kernel space (114). The processor (108) also increments an event counter after receiving the interrupt signal from the I/O device (104). The thread corresponding to the interrupt signal is resumed from the wait state by the processor (108) during the execution of the ISR. After the thread is resumed from the wait state, the thread causes the processor (108) to execute a user-defined function corresponding to the interrupt signal which is stored and executed in the user space (112). When the execution of the user-defined function is completed, the processor (108) places the thread in wait state to receive any further interrupt signals from the I/O device (104). The processor (108) also resets the event counter after executing the user-defined function. The event counter is used to track missed events while debugging the computer system (102).

In an embodiment, the computer system (102) of the present invention implements priority boosting mechanism that ensures immediate execution of the ISR function after receiving the interrupt signal from the I/O device (104).

Generally, real-time computer systems implement a First-In-First-Out (FIFO) scheduler for executing multiple tasks. Each task is assigned a priority which ranges, for example, between 0-99; 0 being the least priority and 99 being the highest priority. Hence, the computer systems execute the tasks having the priority of 99 before the tasks having the priority of 0. The computer systems also allow the user to assign the priority between 0-99 to any user-defined task.

The priority boosting mechanism of the computer system (102) of the present invention offers technical improvement over the priority scheme explained in the above paragraph by providing a priority of 100 to the thread corresponding to the interrupt signal. Since the thread corresponding to the interrupt signal is allotted the priority of 100, the ISR function is executed immediately and without any latency. Hence, the priority boosting mechanism greatly improves the efficiency of the computer system (102).

Figure 2:
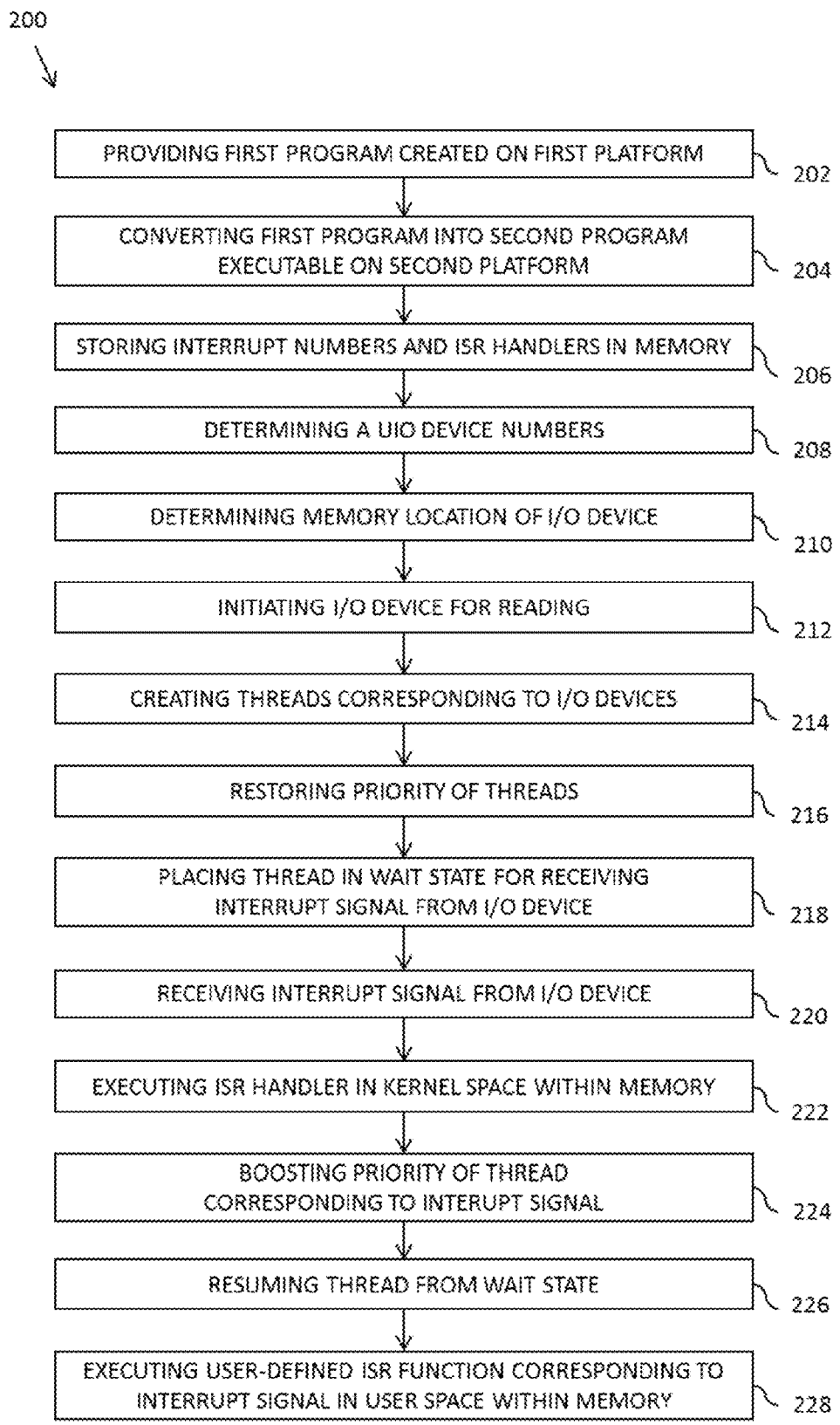
FIG. 2 is a flowchart illustrating a method of handling interrupts in a computer system according to another embodiment of the present invention.

Referring now to FIG. 2, a flowchart illustrating a method of handling interrupts is shown according to an embodiment of the present invention. The flowchart is explained below with reference to the computer implemented interrupt handling system (100) of FIG. 1.

At step 202, the first program which is created on the first platform is provided at the computer system (102).

At step 204, the first program is converted into the second program executable on the second platform.

At step 206, the processor (108) stores the interrupt numbers and the ISR corresponding to the interrupts generated by the I/O devices (104) in the memory (110).

At step 208, the processor (108) determines the UIO device numbers corresponding to the interrupt numbers.

At step 210, the processor (108) determines the memory locations of the I/O devices (104) based on the UIO numbers.

At step 212, the processor (108) initiates the I/O devices for reading.

At step 214, the processor (108) creates the threads corresponding to the I/O devices (104).

At step 216, the processor (108) restores the priorities of the threads corresponding to the I/O devices (104).

At step 218, the processor (108) places the threads in wait state for receiving corresponding interrupt signals from the I/O devices (104).

At step 220, the computer system (102) receives the interrupt signal from the I/O device (104).

At step 222, the processor (108) executes the ISR corresponding to the received interrupt signal in the kernel space (114).

At step 224, the processor (108) boosts the priority of the thread corresponding to the received interrupt signal.

At step 226, the processor (108) resumes the thread from the wait state.

At step 228, the processor (108) executes the user-defined function corresponding to the received interrupt signal in the user space (112).

In operation, the computer implemented interrupt handling system (100) depicted in FIG. 1 and the method of handling the interrupts (202-228) depicted in FIG. 2 include converting the first program created on the first platform (for e.g. VxWorks) into the second program executable on the second platform (for e.g. Linux). Further, the novel interrupt registration API of the present invention stores the interrupt numbers corresponding to the interrupt signals of the I/O devices (104) in the memory (110). The processor (108) determines the UIO numbers corresponding to the interrupt numbers and stores the UIO numbers in the memory (110). Thereafter, the processor (108) determines the memory locations of the I/O devices (104) based on the UIO numbers and initiates the I/O devices (104) for reading. The processor (108) creates the threads for the I/O devices (104) and places the threads in wait state for receiving the interrupt signals from corresponding I/O devices (104).

When the computer system (102) receives the interrupt signal from the I/O device (104), the processor (108) executes the ISR corresponding to the thread in the kernel space (114) and increments the event counter. Thereafter, the thread corresponding to the interrupt signal is resumed from the wait state by the processor (108) during the execution of the ISR. After the thread is resumed from the wait state, the thread causes the processor (108) to execute the user-defined function corresponding to the interrupt signal which is stored and executed in the user space (112) with boosted priority. Thereafter, the processor (108) places the thread in wait state to receive any further interrupt signals from the I/O device (104) and resets the event counter and restores the priority.

Advantageously, the interrupt registration API of the present invention facilitates the execution of the user-defined functions in the user space instead of the kernel space. Therefore, even after the first program is converted into the second program, the interrupts are handled in the user space instead of the kernel space. This facilitates direct porting of user applications made on platforms such as VxWorks to platforms such as Linux, without requiring any change in the interrupt calls of the user applications.

The interrupt registration API of the present invention facilitates the mapping of the peripheral devices into user space by way of memory mapping. This enables the interrupt registration API of the present invention to directly capture event data, such as occurrence of interrupts, into user space instead of kernel space. This is an immense technical improvement over the conventional interrupt handling systems which capture the event data in the kernel space and then transfer the data into the user space. Hence, the latency caused in the conventional interrupt handling systems due to transfer of the event data from the kernel space to the user space is avoided in the interrupt registration API of the present invention, thereby improving the efficiency of the computer system and providing enhanced interrupt handling in the user space. Since the event data is captured in the user space and the ISR functions are also stored and implemented in the user space, there is no need for users to re-define the user-defined functions even when the kernel is upgraded. This enables the user to upgrade the kernel without requiring changing the ISR functions.

Further, the interrupt registration API of the present invention reduces the latency incurred in reception of the interrupt signal and execution of the ISR function, which improves the efficiency of the computer system. Reduced latency enables the computer system to perform real-time functions efficiently and with deterministic latency.

In conventional systems for porting the user applications from one platform to another, the ISR function is split into two parts such that the event capturing is executed in the kernel space and the event processing is executed in the user space. Contrary to such conventional systems, the interrupt registration API of the present invention does not require the ISR to be split into two during the porting of the user application. Therefore, the interrupt registration API of the present invention allows easier and faster porting of user applications from one platform to another, which reduces the complexity of the process of porting and enhances the efficiency of the computing system.

Moreover, the priority boosting mechanism implemented by the interrupt handling system of the present invention enables immediate execution of the ISR functions which further reduces the latency of the computer system.

The foregoing description of the invention has been set merely to illustrate the invention and is not intended to be limiting. Since modifications of the disclosed embodiments incorporating the spirit and substance of the invention may occur to person skilled in the art, the invention should be construed to include everything within the scope of the invention.

It will be apparent to one of the ordinary skill in the art that many modifications, improvements and sub-combinations of the various embodiments, adaptations and variations can be made to the invention without departing from the scope thereof as claimed in the following claims.

REFERENCE SIGNS LIST 100 computer implemented interrupt handling system, 102 computer system, 104a first I/O device, 104b second I/O device, 106 interrupt controller, 108 processor, 110 memory, 112 user space, 114 kernel space

The invention claimed is:

1. An interrupt handling method for a computer system to execute an interrupt handling program on a second platform, the interrupt handling program being created on a first platform, the method comprising:
   storing an interrupt number and corresponding interrupt service routine in a memory of the computer system, wherein the interrupt number corresponds to an input/output device coupled with the computer system;
   determining a user space input/output device number on a basis of the interrupt number, wherein the user space input/output device number corresponds to the input/output device;
   determining a memory location of the input/output device on the basis of the determined user space input/output device number;

initiating the input/output device for reading, on the basis of the determined memory location;
creating a thread corresponding to the input/output device; and
placing the thread in a wait state for receiving an interrupt signal from the input/output device, wherein the interrupt signal corresponds to an interrupt generated by the input/output device;
receiving the interrupt signal from the input/output device;
executing the interrupt service routine in a kernel space within the memory in response to receiving the interrupt signal;
resuming the thread from wait state on the basis of the interrupt service routine; and
executing a user-defined function corresponding to the interrupt signal, in a user space within the memory.

2. The interrupt handling method as claimed in claim 1, further comprising placing the thread in the wait state for receiving another interrupt signal from the input/output device subsequent to executing the user-defined function corresponding to the interrupt signal.

3. The interrupt handling method as claimed in claim 1, further comprising:
incrementing an interrupt event counter subsequent to receiving the interrupt signal from the input/output device; and
resetting the interrupt event counter subsequent to executing the user-defined function corresponding to the interrupt signal.

4. The interrupt handling method as claimed in claim 1, further comprising creating a separate thread for every interrupt.

5. The interrupt handling method as claimed in claim 1, wherein the step of receiving the interrupt signal from the input/output device includes receiving the interrupt signal corresponding to the input/output device through an interrupt controller.

6. The interrupt handling method as claimed in claim 1, wherein the thread is assigned highest priority, thereby reducing latency.

7. A computer system including a memory storing instructions and having a user space and a kernel space, and a computing device coupled with the memory, the computing device comprising a processor which executes the instructions which cause the computing device to:
store an interrupt number and corresponding interrupt service routine in the memory, wherein the interrupt number corresponds to an input/output device coupled with the computer system;
determine a user space input/output device number on a basis of the interrupt number, wherein the user space input/output device number corresponds to the input/output device;
determine a memory location of the input/output device on the basis of the determined user space input/output device number;
initiate the I/O device for reading, on the basis of the determined memory location;
create a thread corresponding to the input/output device;
place the thread in a wait state to receive an interrupt signal from the input/output device, wherein the interrupt signal corresponds to an interrupt generated by the input/output device;
receive the interrupt signal from the input/output device;
execute the interrupt service routine in the kernel space in response to receiving the interrupt signal;
resume the thread from wait state on the basis of interrupt service routine; and
execute a user-defined function corresponding to the interrupt signal, in the user space.

8. The computer system as claimed in claim 7, wherein the computing device is further configured to place the thread in the wait state for receiving another interrupt signal from the input/output device subsequent to executing the user-defined function corresponding to the interrupt signal.

9. The computer system as claimed in claim 7, wherein the computing device is further configured to:
increment an interrupt event counter subsequent to receiving the interrupt signal from the input/output device, and
reset the interrupt event counter subsequent to executing the user-defined function corresponding to the interrupt signal.

10. The computer system as claimed in claim 7, wherein the computing device is further configured to create a separate thread for every interrupt.

11. The computer system as claimed in claim 7, wherein the interrupt signal is received from the input/output device by way of an interrupt controller.

12. The computer system as claimed in claim 7, wherein the thread is assigned highest priority, thereby reducing latency.

13. A non-transitory storage medium storing a program for causing a computer system including a computing device to execute an interrupt handling program on a second platform, the interrupt handling program being created on a first platform, wherein the program causes the computing device to perform the operations of:
storing an interrupt number and corresponding interrupt service routine in a memory coupled with the computing device, wherein the interrupt number corresponds to an input/output device coupled with the computer system;
determining a user space input/output device number on a basis of the interrupt number, wherein the user space input/output device number corresponds to the input/output device;
determining a memory location of the input/output device on the basis of the determined user space input/output device number;
initiating the input/output device for reading, on the basis of the determined memory location;
creating a thread corresponding to the input/output device;
placing the thread in a wait state for receiving an interrupt signal from the input/output device, wherein the interrupt signal corresponds to an interrupt generated by the input/output device;
receiving the interrupt signal from the input/output device;
executing the interrupt service routine in a kernel space within the memory in response to receiving the interrupt signal;
resuming the thread from wait state on the basis of the interrupt service routine; and
executing a user-defined function corresponding to the interrupt signal, in a user space within the memory.

14. The storage medium as claimed in claim 13, wherein the program causes the computing device to further perform an operation of placing the thread in the wait state for receiving another interrupt signal from the input/output device subsequent to executing the user-defined function corresponding to the interrupt signal.

15. The storage medium as claimed in claim 13, wherein the program causes the computing device to further perform an operation of creating a separate thread for every interrupt.

16. The storage medium as claimed in claim 13, wherein the program causes the computing device to further perform operations of:
- incrementing an interrupt event counter subsequent to receiving the interrupt signal from the input/output device; and
- resetting the interrupt event counter subsequent to executing the user-defined function corresponding to the interrupt signal.

17. The storage medium as claimed in claim 13, wherein the operation of receiving the interrupt signal from the input/output device includes receiving the interrupt signal corresponding to the input/output device through an interrupt controller.

18. The storage medium as claimed in claim 13, wherein the thread is assigned highest priority, thereby reducing latency.

\* \* \* \* \*